(12) United States Patent
Roy et al.

(10) Patent No.: US 12,488,870 B2
(45) Date of Patent: Dec. 2, 2025

(54) SYSTEMS AND METHODS FOR AUTOMATICALLY PREDICTING INCORRECT DRUG DISPENSED EVENTS IN A PHARMACY

(71) Applicant: Walmart Apollo, LLC, Bentonville, AR (US)

(72) Inventors: Shilka Roy, Bangalore (IN); Rahul Kumar Mishra, Bengaluru (IN); Nareshkumar Patel, Cumming, GA (US); Sujit Jos, Ernakulam (IN); Manish S. Patel, Monmouth Junction, NJ (US)

(73) Assignee: Walmart Apollo, LLC, Bentonville, AR (US)

( * ) Notice: Subject to any disclaimer, the term of this patent is extended or adjusted under 35 U.S.C. 154(b) by 495 days.

(21) Appl. No.: 18/103,808

(22) Filed: Jan. 31, 2023

(65) Prior Publication Data
US 2023/0307111 A1    Sep. 28, 2023

Related U.S. Application Data

(60) Provisional application No. 63/306,892, filed on Feb. 4, 2022.

(51) Int. Cl.
*G16H 20/13* (2018.01)
(52) U.S. Cl.
CPC ................... *G16H 20/13* (2018.01)
(58) Field of Classification Search
CPC ........ G16H 20/13; G16H 40/20; G16H 70/40; G16H 20/10
See application file for complete search history.

(56) References Cited

U.S. PATENT DOCUMENTS 7,716,068 B2 *   5/2010   Ball ..................... G16H 70/40
                                                600/300
8,046,242 B1 *  10/2011   daCosta .............. G16H 10/60
                                                600/300
(Continued)

FOREIGN PATENT DOCUMENTS

CN          109448808 A       3/2019

OTHER PUBLICATIONS

Rash-Foanio, C., et al., "Automated Detection of Look-Alike. Sound-Alike Medication Errors," Am J Health-Syst Pharm, vol. 74, No. 7, pp. 521-527 Apr. 1, 2017.
(Continued)

*Primary Examiner* — Michael Collins
(74) *Attorney, Agent, or Firm* — DICKINSON WRIGHT RLLP; Hector A. Agdeppa

(57) ABSTRACT

A system comprising one or more processors and one or more non-transitory computer-readable media storing computing instructions that, when executed on the one or more processors, cause the one or more processors to perform functions comprising: receiving a drug profile for a drug identified as part of a high-risk look-alike-sound-alike (LASA) drug pair prior to filling a prescription for the drug; generating an anomaly score based on direction components of the drug profile; and transmitting an alert to a fulfilment screen when the anomaly score exceeds a predetermined threshold. Other embodiments are disclosed.

20 Claims, 9 Drawing Sheets

(56) References Cited

U.S. PATENT DOCUMENTS

| | | | | |
|---|---|---|---|---|
| 8,548,824 B1* | 10/2013 | daCosta | ................. | G16H 20/13 |
| | | | | 705/3 |
| 8,688,468 B1* | 4/2014 | daCosta | ................. | G16H 20/10 |
| | | | | 705/2 |
| 11,010,468 B1* | 5/2021 | Katz | ..................... | G06F 21/552 |
| 2004/0059600 A1* | 3/2004 | Ball | ...................... | G06Q 10/10 |
| | | | | 705/2 |
| 2004/0059601 A1* | 3/2004 | Ball | ...................... | G06F 40/226 |
| | | | | 705/2 |
| 2004/0059602 A1* | 3/2004 | Ball | ...................... | G16H 40/67 |
| | | | | 705/2 |
| 2004/0078247 A1* | 4/2004 | Rowe, III | .......... | G06Q 20/4016 |
| | | | | 705/4 |
| 2021/0272666 A1 | 9/2021 | Cornacchio et al. | | |

OTHER PUBLICATIONS

Dos Santos, H.D.P., et al., "DDC-Outlier: Preventing Medication Errors Using Unsupervised Learning," IEEE Journal of Biomedical and Health Informatics, vol. 14, No. 8, DOI 10.1109/JBHL.2018.2828028 Aug. 2018.

* cited by examiner

900

- 910 – Receiving a drug profile for a drug identified as part of a high-risk look-alike-sound-alike (LASA) drug pair
- 920 – Generating an anomaly score based on direction components
- 930 – Creating a top-k LASA list of high-risk LASA pairs
- 940 – Updating the top-k LASA list at periodic intervals expenditures
- 950 – Deleting a first drug pair of the drug pairs
- 960 – Adding a second drug pair of the drug pairs
- 970 – Transmitting an alert to a fulfillment screen

FIG. 9

SYSTEMS AND METHODS FOR AUTOMATICALLY PREDICTING INCORRECT DRUG DISPENSED EVENTS IN A PHARMACY

CROSS-REFERENCE TO RELATED APPLICATIONS

This application claims the benefit of U.S. Provisional Application No. 63/306,892, filed Feb. 4, 2022. U.S. Provisional Application No. 63/306,892 is incorporated herein by reference in its entirety.

TECHNICAL FIELD

This disclosure relates generally to systems and methods for automatically predicting incorrect drug dispensed events in a pharmacy.

BACKGROUND

Medication errors sometimes occur due to incorrect fulfilment of drug prescriptions. Sometimes, these errors are due to pharmacy personnel misreading or misinterpreting a prescription. For example, in some cases, prescriptions have been misinterpreted when a drug name on the prescription was confused with a different drug having a similar name.

BRIEF DESCRIPTION OF THE DRAWINGS

To facilitate further description of the embodiments, the following drawings are provided in which:

FIG. 9 illustrates a flow chart for a method 900 of determining whether or not a drug prescribed in a prescription is an incorrect drug identified as part of a LASA pair, according to an embodiment.

Figure 1:
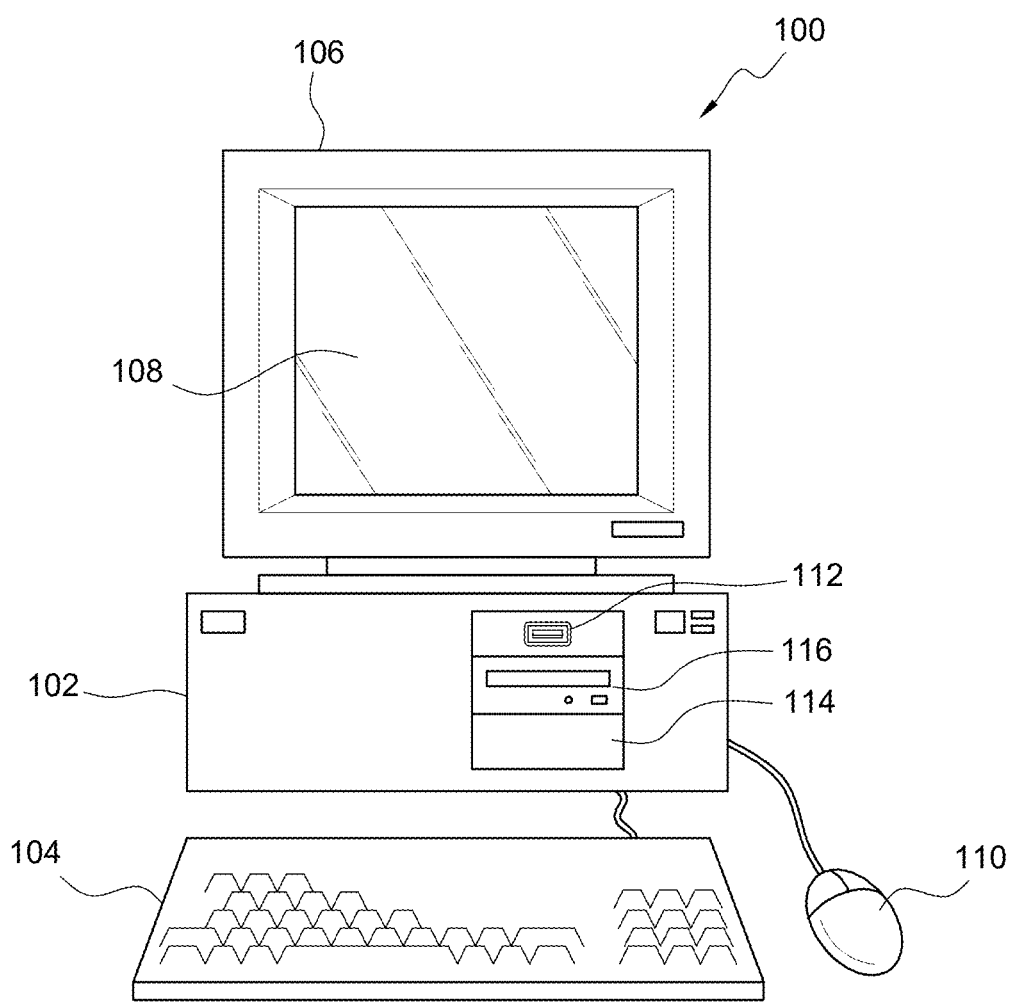
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus. The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant.

"Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
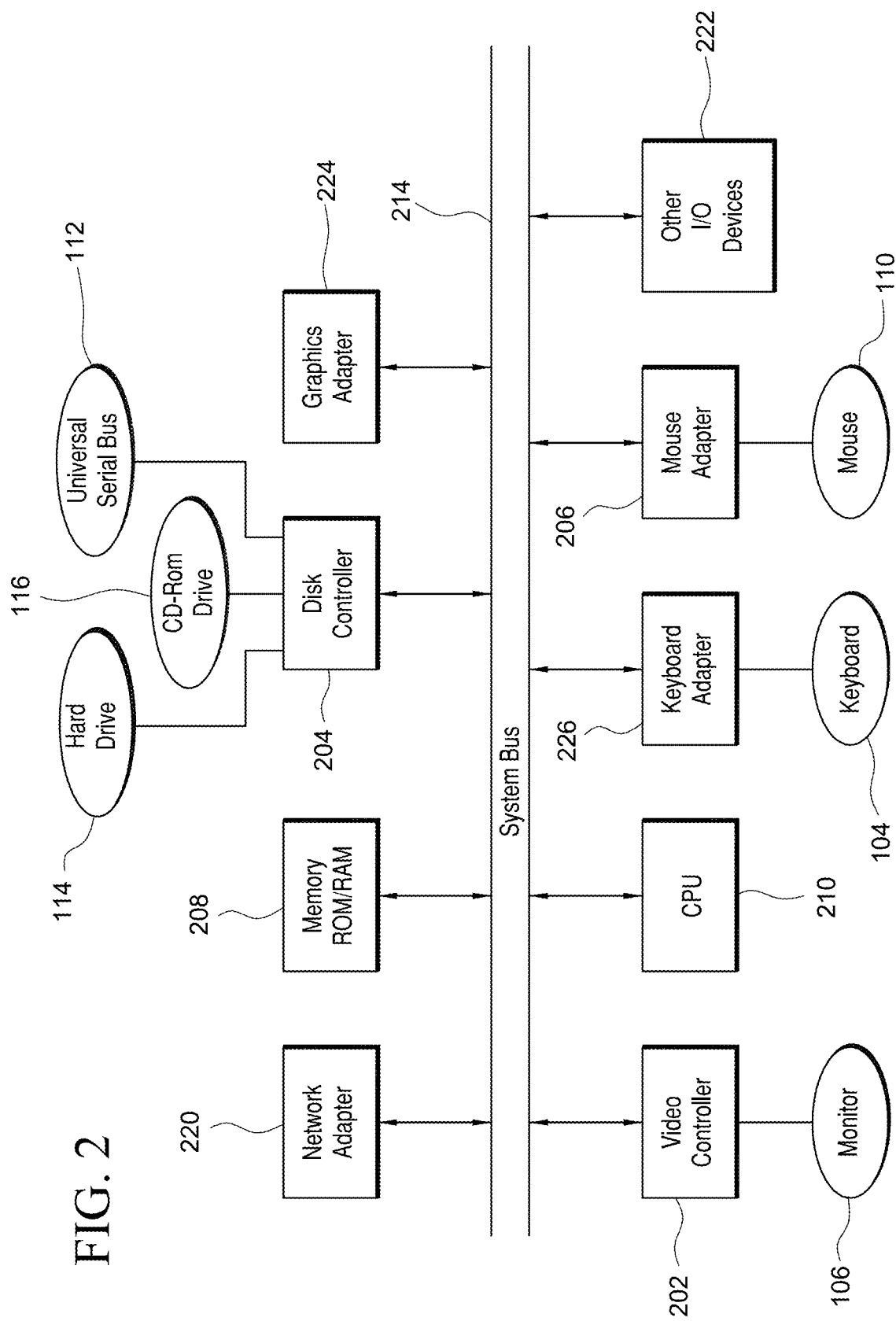
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families. Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
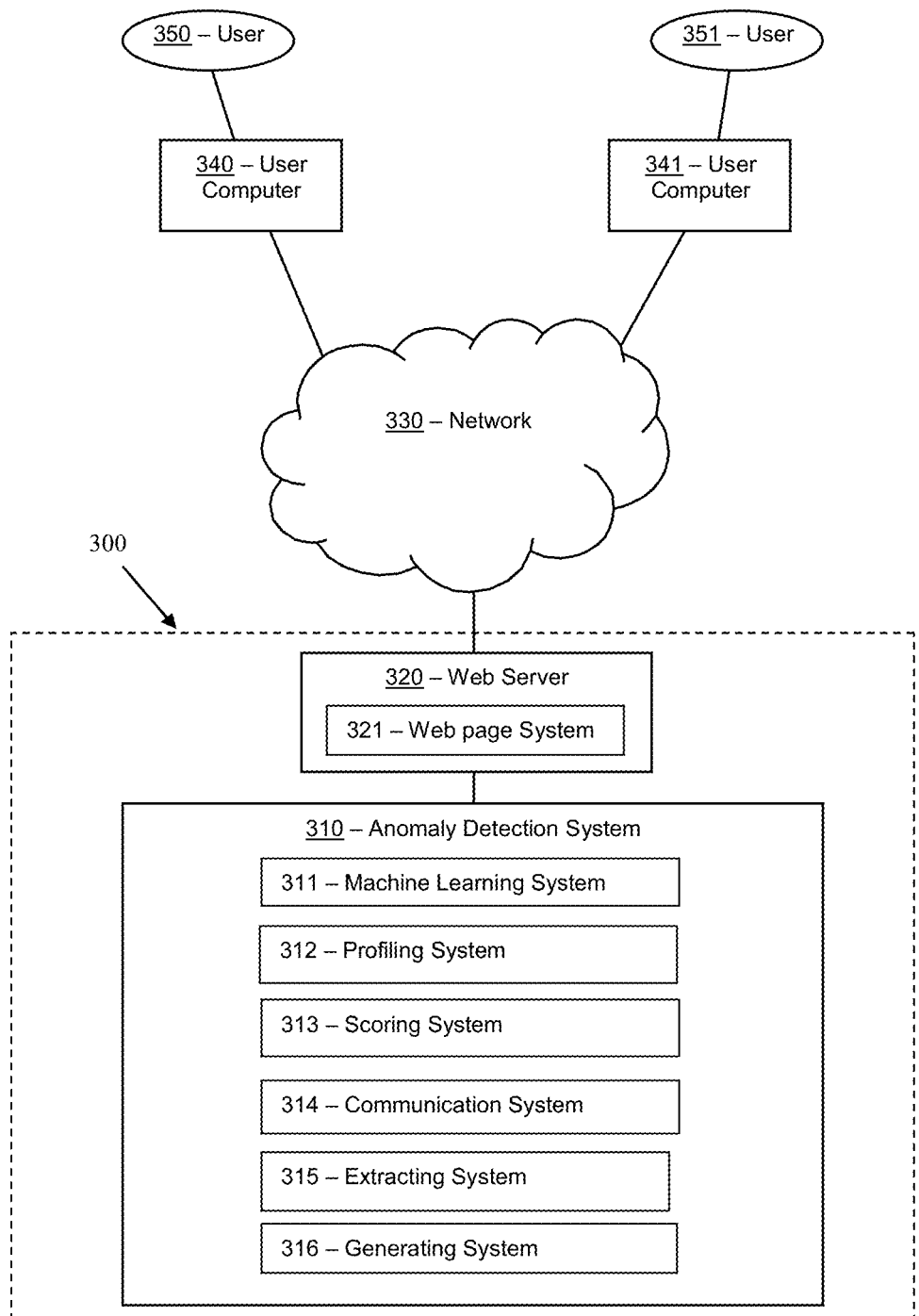
FIG. 3 illustrates a block diagram of a system that can be employed for automatically predicting incorrect drug dispensed events, according to an embodiment.

Turning ahead in the drawings, FIG. 3 illustrates a block diagram of a system 300 that can be employed for automatically predicting incorrect drug dispensed events, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include an anomaly detection system 310 and/or a web server 320. Anomaly detection system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, anomaly detection system 310 and/or web server 320. Additional details regarding anomaly detection system 310 and/or web server 320 are described herein.

In a number of embodiments, each of anomaly detection system 310 and/or web server 320 can be a special-purpose computer programed specifically to perform specific functions not associated with a general-purpose computer, as described in greater detail below.

In some embodiments, web server 320 can be in data communication through network 330 with one or more user computers, such as user computers 340 and/or 341. Network 330 can be a public network, a private network or a hybrid network. In some embodiments, user computers 340-341 can be used by users, such as users 350 and 351, which also can be referred to as customers, users, patients, technicians, in which case, user computers 340 and 341 can be referred to as customer computers. In many embodiments, web server 320 can host one or more sites (e.g., websites) that allow users to browse and/or search for items (e.g., products), to add prescriptions to a pharmacy, in addition to other suitable activities. In several embodiments, prescriptions can be paper prescriptions, digital prescriptions (e.g., eRx), mail order prescriptions, and/or another suitable transmittal event. In a number of embodiments, the pharmacy can be a pharmacy within a department store, a grocery store, or a super store (e.g., both a grocery store, pharmacy, and a department store), or a standalone pharmacy. In many embodiments, the pharmacy can fill mail orders prescriptions.

In some embodiments, an internal network that is not open to the public can be used for communications between anomaly detection system 310 and/or web server 320 within system 300. Accordingly, in some embodiments, anomaly detection system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In some embodiments, network 330 can be an internal network that is not open to the public, which can be used for communications between system 300 and web server 320. In other embodiments, network 330 can be a public network, such as the Internet. In several embodiments, operators and/or administrators of system 300 can manage system 300, the processor(s) of system 300, and/or the memory storage unit(s) of system 300 using the input device(s) and/or display device(s) of system 300, or portions thereof in each case.

In several embodiments, system 300 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300. In a similar manner, the processors and/or the non-transitory computer-readable media can be local and/or remote to each other.

Meanwhile, in many embodiments, system 300 also can be configured to communicate with and/or include one or more databases. The one or more databases can include a product database that contains information about drugs, items, prescriptions, and/or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between system 300, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, anomaly detection system 310 can include a machine learning system 311, a profiling system 312, a scoring system 313, a communication system 314, an extracting system 315 and/or a generating system 316. In many embodiments, the systems of anomaly detection system 310 can be modules of computing instructions (e.g., software modules) stored at non-transitory computer readable media that operate on one or more processors. In other embodiments, the systems of anomaly detection system 310 can be implemented in hardware. Anomaly detection system 310 can be a computer system, such as computer system 100 (FIG. 1), as described above, and can be a single computer, a single server, or a cluster or collection of computers or servers, or a cloud of computers or servers. In another embodiment, a single computer system can host anomaly detection system 310. Additional details regarding anomaly detection system 310 and the components thereof are described herein.

In some embodiments, dispensing a correct (e.g., accurate) prescribed drug along with the correct drug direction can form a basis of patient safety in a pharmacy. In several embodiments, several medication errors in pharmacies can occur during dispensing and any error in the process can lead to catastrophic results for the patient (e.g., user). In various embodiments, numerous studies on medication errors pointed out that "look-alike, sound-alike" (LASA) drug names can be one of the major causes of medication errors of healthcare providers. In some embodiments, in order to overcome the limitations of existing alerting systems with high false positive alerts, a targeted alerting framework for LASA drugs can be based on an evaluation of historical medication errors occurring in a pharmacy setting.

In a number of embodiments, the framework can combine (i) identifying LASA drug pairs based on recent medication errors and (ii) targeted alerts using a drug purchase history of a patient. In various embodiments, the framework can include a statistical check on the suitability of direction for a drug based on the historical prescription profile of a drug. In some embodiments, the framework can support a decision process of pharmacists early-on in a fulfilment cycle by alerts for potential medication errors. In several embodiments, an advantage of a targeted alerting approach can include obtaining a higher recall with reduced alerts. In various embodiments, another advantage of the framework, validated retrospectively with actual pharmacy data, can be shown as effective with a recall of over 80% for reported events caused by LASA.

In various embodiments, every year in United states, more than 4 billion retail prescriptions can be filled at pharmacies in the United States, where approximately 7,000 to 9,000 people can die because of a medication error. In some embodiments, medication errors can happen at any point in the life cycle of a prescription, beginning from a prescribing stage to a fulfilment stage which can include dispensing, filling, and placing the prescription in a bag. In several embodiments, to address medication errors, some Countries can follow a dedicated Patient Safety Acts which aims to establish systems for voluntary reporting of information on patient safety by hospitals, doctors, and/or healthcare providers. In several embodiments, the instances of medication and prescribing errors reported can be referred to as "patient safety events." In some embodiments, this type of data can (i) provide valuable insights and (ii) helpful in developing preventive systems against medication errors.

While these "patient safety events" can be caused by a myriad of causes, in some embodiments, one of the most potent causes can include confusing drug names with other drug names, which can be further aggravated by illegible handwriting on physical prescriptions. In several embodiments, since drug confusion errors can be very harmful, and/or even fatal in some cases, recognizing such events before they can happen is of utmost importance.

In various embodiments, creating a system for pharmacies can include practices, such as Tallman lettering, currently used to enforce double-checking by pharmacists in a pharmacy for look-alike, sound-alike (LASA) drug pairs. In several embodiments, for pharmacies with hundreds of prescriptions coming in everyday, using Tallman lettering can lead to "alert fatigue" among pharmacists. In some embodiments, such practices can desensitize the pharmacists who are responding to them, while increasing workload for the pharmacist in the form of conducting multiple checks. In a number of embodiments, many current approaches omit including recent patient safety events which can help narrow down the scope of alerting medication errors.

In several embodiments, a goal of this methodology can include providing a probabilistic, real-time alerting framework to minimize the occurrence of drug name related patient safety events while controlling the number of alerts generated. Within this framework, in some embodiments, the system can (i) analyze the collected data from a large scale pharmacy and (ii) automatically identify prescriptions which can be potentially incorrect at an early stage of the fulfilment cycle. In various embodiments, testing the alerting framework retrospectively can include testing prescription fulfilments in a pharmacy over a specified period of time. As patient safety events can be an extremely rare phenomena, in some embodiments, the system, evaluated by using recall of events, can include detecting vis-a-vis the number of alerts generated.

Figure 4:
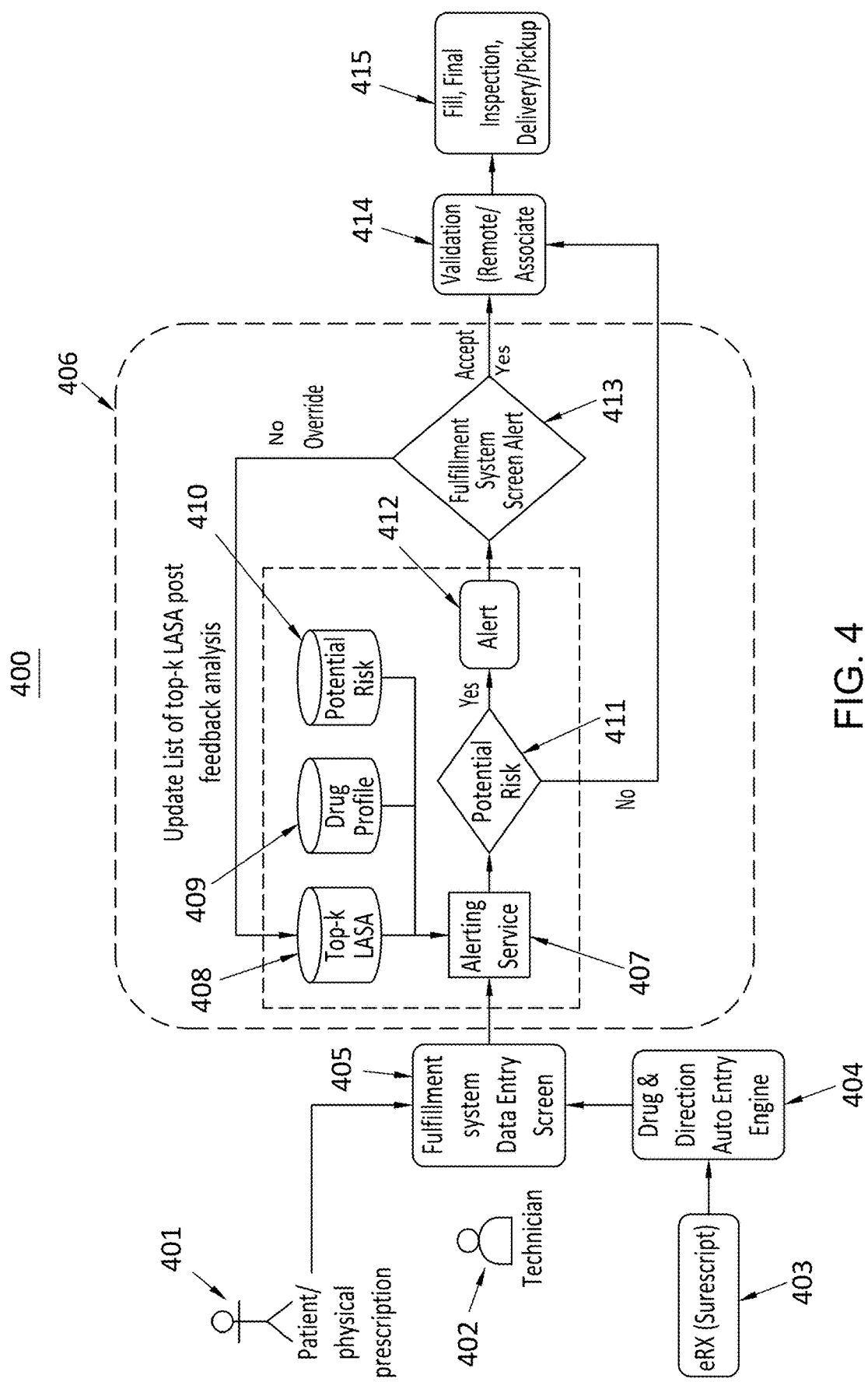
FIG. 4 illustrates a flow chart for a method of identifying a potential risk of a LASA drug prescribed while fulfilling a prescription in a dispensing facility, according to an embodiment.

Jumping ahead in the drawings, FIG. 4 illustrates a flow chart for a method 400 of identifying a potential risk of a LASA drug prescribed while fulfilling a prescription in a dispensing facility, according to an embodiment. Method 400 also can be utilized to alert the fulfilment system prior to dispensing the LASA drug based on a patient profile. Method 400 can be utilized in many different embodiments and/or examples not specifically depicted or described herein. In some embodiments, the procedures, the processes, and/or the activities of method 400 can be performed in the order presented or in parallel. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as anomaly detection system 310 and/or web server 320. The processor(s) can be similar or identical to the processor(s) described above with respect to computer system 100 (FIG. 1).

In several embodiments, method 400 can include a block 405 of receiving a prescription at a drug dispensary (e.g., a pharmacy) from a user as input into a fulfilment system computer. In many embodiments, the user can include a patient 401, a technician 402, and/or another user, or from a drug & direction auto entry engine 404 that can process electronic prescriptions 403. Electronic prescriptions 403 can be digital and/or an electronic prescription from a prescribing entity (e.g., doctor, hospital) for a patient.

In various embodiments, drug & direction auto entry engine 404 can extracting and/or parsing electronic prescription to identify patient information, the prescribed drug, and direction components, as prescribed. In many embodiments, the data extracted can be converted to digital format, such as a vector, prior to inputting the data into a computer system (e.g., drug & direction auto entry engine 404).

The prescription data can be received into a fulfilment system computer, such as a pharmacy. In some embodiments, method 400 can proceed after block 405 to a block 406.

In a number of embodiments, method 400 can include block 406 determining whether or not to raise an alert for a prescribed drug. In some embodiments, block 406 can be considered an alert phase, which can be followed by a block 414, which can be considered a validation phase. In some embodiments, block 406 can include a block 407 of receiving the prescription and other information at an alerting service. The other information can include information from various databases, such as a database 408, a database 409 and/or a database 410. In some embodiments, database 408 can include a database for a top-k LASA list that can be updated periodically as part of a feedback loop. In several embodiments, database 409 can store drug profiles for multiple prescription drugs including known LASA drug pairs. Drug profiles are discussed further below. In some embodiments, database 410 can store profiles of patients based on drug purchase histories and prescriptions over a period of time, such as 1 year. In many embodiments, block 406 can proceed after block 407 to a block 411.

In various embodiments, block 407 can include block 411 of determining whether or not the drug is a potential risk, in which the prescribed drug and/or the associated direction components of the prescription for the drug are such that the it would be beneficial to trigger an alert of a potential incorrect drug being dispensed. Determining whether or not the drug is a potential risk can include identifying one of the following conditions and/or factors: (i) the drug is part of a LASA drug pair (e.g., Top-k LASA list, other LASA drug pairs), (ii) the drug has a confusable drug name, (iii) drug directions are contrary to the acceptable drug profile for that drug, (iv) no previous prescription purchase history for the patient, (v) the type of prescription (e.g., physical, digital, mail order), (vi) a patient profile, (vii) a drug profile, (viii) history of overrides, (ix) history of alerts triggered, (x) patient history over a time period, (xi) history of incorrect drug dispensed events, (xii) history of a LASA drug pair counterpart prescribed, (xiii) illegible handwriting by a medical provider (e.g., doctor), (xiv) a prescription error for an incorrect drug, and/or another suitable condition. In several embodiments, if the output of block 411 is yes, block 411 can proceed to a block 412. Otherwise, if the output of block 411 is no, block 406 can proceed to block 414.

In several embodiments, block 406 can include block 412 of proactively triggering an internal alert (e.g., user interface alert) for detection of potential inaccuracies observed during the drug dispensing event. Such inaccuracies can include drug names, drug attributes, historical purchases, prescription history and/or another suitable drug inaccuracies. In many embodiments, block 412 also can trigger an indication that an incorrect drug is potentially being dispensed in a drug dispensing event. In various embodiments, block 412 further can include displaying the alert on a user interface in a larger bolded font, blinking lights, a haptic motion, an audible sound associated with an alert, approval of acceptance or an override of the alert, and/or another suitable indication.

In some embodiments, triggering an internal event can automatically initiate additional scrutiny and/or review. In several embodiments, a customized system to prevent drug errors induced by look-alike, sound-alike drug pairs can include generating targeted alerts with high recall and low alert rate. In some embodiments, the system can take into account the prescribed direction and generate the alerts in real-time, in a large scale pharmacy thereby addressing many of the shortcomings of other approaches. In some embodiments, the architecture can be designed to proactively alert the pharmacist at an early stage of fulfilment, such as during entry of the prescription information into the system. In several embodiments, the full architecture can be applicable where incoming prescription can be routed to pharmacy through e-prescribing software, where the prescribed direction from a doctor (e.g., health care providers), a drug name, and recorded "safety events" are available for a period of a minimum of 1 year and/or another suitable time period. In various embodiments, availability of a past purchase history of a patient can be beneficial but unnecessary for one of the components of alerting framework. In many embodiments, block 406 can proceed after block 412 to a block 413.

In a number of embodiments, block 406 can include block 413 of receiving feedback of whether or not the correct drug is being dispensed during a drug dispensing event. If block 413 is yes, block 413 can proceed to a block 414. Otherwise, if block 413 is no, information about the alert can be fed back into database 408 to update a current list of top-k LASA drug pairs with feedback analysis.

In some embodiments, method 400 also can include block 414 of validating that the drug as prescribed is the correct drug. For example, the drug can be validated electronically by a remote location (e.g., a back office location) or by a technician (e.g., associate) at a pharmacy location double checking that the drug is correctly prescribed. In many embodiments, method 400 can proceed after block 414 to a block 415.

In various embodiments, method 400 can include block 415 of filling the drug, which can include conducting a final inspection prior to fulfilling the prescription for the patient by dispensing the drug as prescribed. In several embodiments, block 415 also can include delivering the prescribed drug and/or preparing the prescribed drug for pick-up by the patient (e.g., user).

Figure 5:
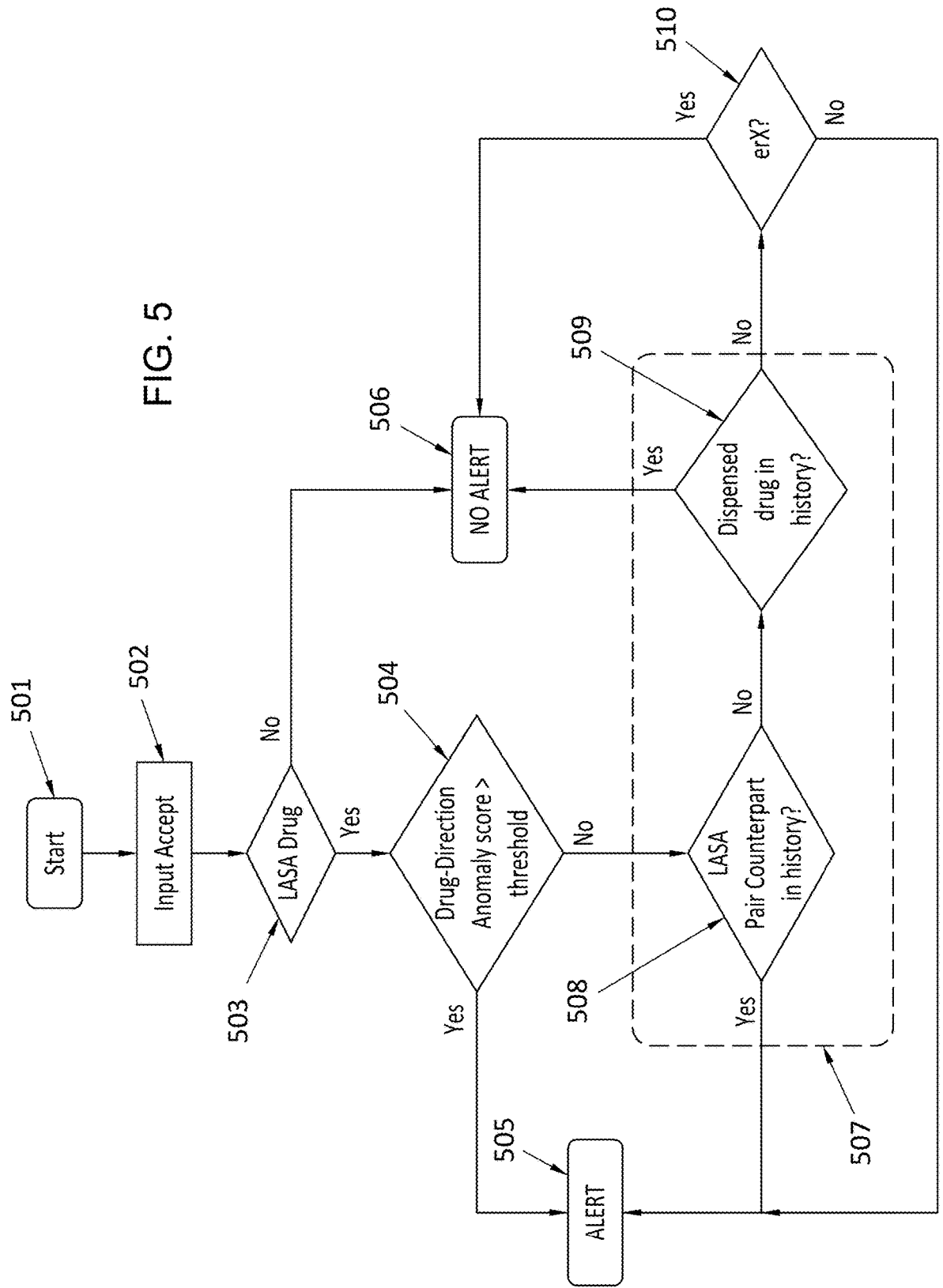
FIG. 5 illustrates a flow chart for a method of determining whether or not to trigger an alert (e.g., internal alert) based on drug-direction (e.g., direction components) anomaly scores, according to an embodiment.

Turning ahead in the drawings, FIG. 5 illustrates a flow chart for a method 500 of determining whether or not to trigger an alert (e.g., internal alert) based on drug-direction (e.g., direction components) anomaly scores, according to an embodiment. Method 500 also can include triggering an alert after detecting a LASA drug pair counterpart is part of a one-year patient purchase history. Method 500 further can include trigging an alert when an anomaly score (e.g., drug-direction) exceeds a predetermined threshold score for the prescribed drug. Method 500 further can illustrate how site selection models can learn via data from a feedback loop by tracking metrics during and after execution of the project initiative. Method 500 can be employed in many different embodiments and/or examples not specifically depicted or described herein. In some embodiments, the procedures, the processes, and/or the activities of method 500 can be performed in the order presented or in parallel. In other embodiments, the procedures, the processes, and/or the activities of method 500 can be performed in any suitable order. In still other embodiments, one or more of the procedures, the processes, and/or the activities of method 500 can be combined or skipped. In several embodiments, system 300 (FIG. 3) can be suitable to perform method 500 and/or one or more of the activities of method 500.

In these or other embodiments, one or more of the activities of method 500 can be implemented as one or more computing instructions configured to run at one or more processors and configured to be stored at one or more non-transitory computer-readable media. Such non-transitory computer-readable media can be part of a computer system such as anomaly detection system 310 and/or web server 320. The processor(s) can be similar or identical to the processor(s) described above with respect to computer system 100 (FIG. 1).

In several embodiments, method 500 can include a block 501 of starting by receiving a prescription for a drug prescribed by a medical provider. In some embodiments, the prescription can be received in various formats: (i) physical prescription, (ii) digital or electronic, (iii) mail order, and/or another suitable communication format. In various embodiments, receiving a prescription for a drug can be a new prescription and/or a refill request for the prescribed drug. In many embodiments, method 500 can proceed after block 501 to a block 502.

In various embodiments, method 500 can include block 502 of accepting the data from the prescription into a fulfilment system computer (e.g., pharmacy computer). Blocks 501 and/or 502 can be similar or identical to block 405 (FIG. 4). In many embodiments, method 500 can proceed after block 502 to a block 503.

In several embodiments, method 500 can include block 503 of determining whether the prescribed drug is part of a LASA drug pair. If yes, method 500 can proceed to block 504. Otherwise, block 503 is no, method 500 can proceed to block 506. Various activities of block 503 can be similar or identical to various activities above in connection with blocks 407 and/or 408 (FIG. 4).

In some embodiments, a methodology can utilize a three-pronged approach for intervention to prevent incorrect drug events due to LASA drugs. In many embodiments, this methodology can broadly include the (i) analysis of the compatibility of a drug name to a potential risky LASA list, (ii) components of a drug direction such as dosage, frequency, and/or indications, and (iii) the drug purchase history of a patient. In some embodiments, the alerting framework can be divided into three stages discussed further below: (1) identifying confusable drug pairs, (2) anomaly rule identification, and (3) patient purchase evaluation.

In some embodiments, identifying confusable drug pairs can include confusing drug names as a major contributor to drug incorrect events. In many embodiments, however, generating alerts for all the LASA drugs pairs in an Institute of Safe Medication Practices (ISMP)'s list can result in a very high alert rate leading to alert fatigue for the pharmacists which can further increase the number of patient safety events. In some embodiments, curbing alert fatigue and an increased number of patient safety events can include identifying a list of LASA pairs which are relevant for the pharmacy based on historical LASA events.

In many embodiments, patient purchase evaluation can begin with a selected list of LASA pairs. In several embodiments, in the case of an event being missed after the anomaly identification stage, another layer in the methodology can include the evaluation of a purchase pattern of a patient to be an alert for LASA events. In some embodiments, for patients with a past purchase history in the pharmacy, a profile can be created for each patient with drugs, prescribed and sold, within the past 1 year and/or another suitable period of time. For example, if a patient is prescribed Hydroxyzine, the system can determine if a LASA counterpart Hydralazine has also been prescribed in the past for that patient. In following with the example, if hydralazine is present in a purchase history of the patient, an alert is generated. However, if hydralazine is not present in the purchaser history of the patient, but hydroxyzine is present, no alert is generated. Examples of LASA drug pairs are illustrated below in Table 1, as follows.

TABLE 1

| EXAMPLES OF LASA PAIRS | |
|---|---|
| HYDRALAZINE | HYDROXYZINE |
| LIOTHYONINE | LEVOTHYROXIN |
| AZULFIDINE | SULFADIAZINE |
| LOVASTATIN | ROSUVASTAIN |
| ADDERALL | ADDERALL XR |

In some embodiments, in Table 2, the identification of LASA list pairs is based on a 1-year time period of reported events data, due to incorrect drugs dispensed, including both actual events and near miss events. In several embodiments, the events considered, where the originally prescribed drug and the dispensed drug, included a different name or a different release form.

TABLE 2

| RETROSPECTIVE ANALYSIS RESULTS | | | |
|---|---|---|---|
| Time Frame (2020) | Recall % of LASA Events reported | Alert Rate | Total alerts per store per month |
| July | 85% | 3.6% | 300+ |
| October | 88% | 3.5% | 350+ |
| November | 84% | 3.8% | 350+ |

In some embodiments, to identify if a drug pair is look-alike, Bi-Sim or soft-Bisim with pre-trained weights can be utilized to calculate the average look-alike similarity. In several embodiments, to identify if a drug pair is sound-alike, Editex similarity can be utilized. In various embodiments, the algorithm of bigram, soft bigram, and Editex, can be chosen after evaluating the algorithm on a set of ISMP's 956 confusion sets (both look-alike and sound-alike), which can include 724 unique drug names. In some embodiments, for each of the unique drug names, different LASA algorithm can be used to rank a top-k similar names for each drug. In many embodiments, the recall for a combination of Bigram, soft-bigram and Editex can be similar to trigram and Editex, and at k=1, the former illustrated a higher recall and thus chosen. For example, 82% LASA pairs from 956 ISMP pairs are identified with the selected threshold on the similarity score.

In a number of embodiments, method 500 can include block 504 of determining whether a drug-direction anomaly score for the drug being prescribed exceeds a predetermined threshold. In some embodiments, a potential compatibility of drugs and prescribed directions (available in electronic prescriptions, comprising of ~85% Rxs) can be carried out in an unsupervised setting of machine learning.

The machine-learning model can be an insolation forest based anomaly detection model or another outlier detection model, such as propensity models, KNN based outlier detection, and/or clustering-based outlier detection.

In several embodiments, a training dataset used to train insolation forest machine learning model includes using historical prescription records of patients over a period of time and the direction components in those historical prescription records, and output included the drug-direction anomaly score. If block 504 is yes, method 500 can proceed to block 505. Otherwise block 504 is no, method 500 can proceed to a block 508.

In several embodiments, method 500 can include block 505 of triggering an alert based on the anomaly score exceeding a predetermined threshold. Block 505 can be similar or identical to block 412 (FIG. 4).

In many embodiments, method 500 can include block 506 of not triggering an alert.

In various embodiments, blocks 508 and 509 can be part of a group 507 in which patient history is used. For example, patient purchase history, patient purchase profiles, and/or patient profiles for a predetermined period of time can be used. In many embodiments, the predetermined period of time can be one year, two years, ten years, and/or another suitable time period. In several embodiments, the patient purchase profile (history) and nature of a prescription for targeted alerting can include a profile for a patient with each drug prescription filled during the purchase history of the patient with a past purchase history. In various embodiments, a patient purchase profile can be used in determining if corresponding LASA pair counterpart has been prescribed in past for that patient. In many embodiments, if a LASA pair counterpart is present in purchase history of the patient, an alert can be generated. In some embodiments, for non-electronic prescriptions (physical prescriptions) without a previous purchase history, an alert can be generated.

In several embodiments, method 500 can include block 508 of determining whether or not a drug prescribed in the prescription is part of a LASA drug pair counterpart prescribed and/or dispensed in the prescription purchase history or prescription history of patient over a time period. If block 508 is yes, method 500 can proceed to block 505 of triggering an alert. Otherwise, block 508 is no, and method 500 can proceed to a block 509.

In various embodiments, method 500 can include block 509 of determining whether or not the drug prescribed was previously dispensed in the prescription purchase history or the prescription history of the patient over a period of time. If block 508 is yes, method 500 can proceed to block 506 of not triggering an alert. Otherwise block 509 is no, and method 500 can proceed to a block 510.

In some embodiments, method 500 can include block 510 of determining whether or not the prescription was an electronic or digital prescription (e.g., eRx). If block 510 is yes, method 500 can proceed to block 506 of not triggering an alert. Otherwise, block 510 is no, method 500 can proceed to block 505 of triggering an alert.

Figure 6:
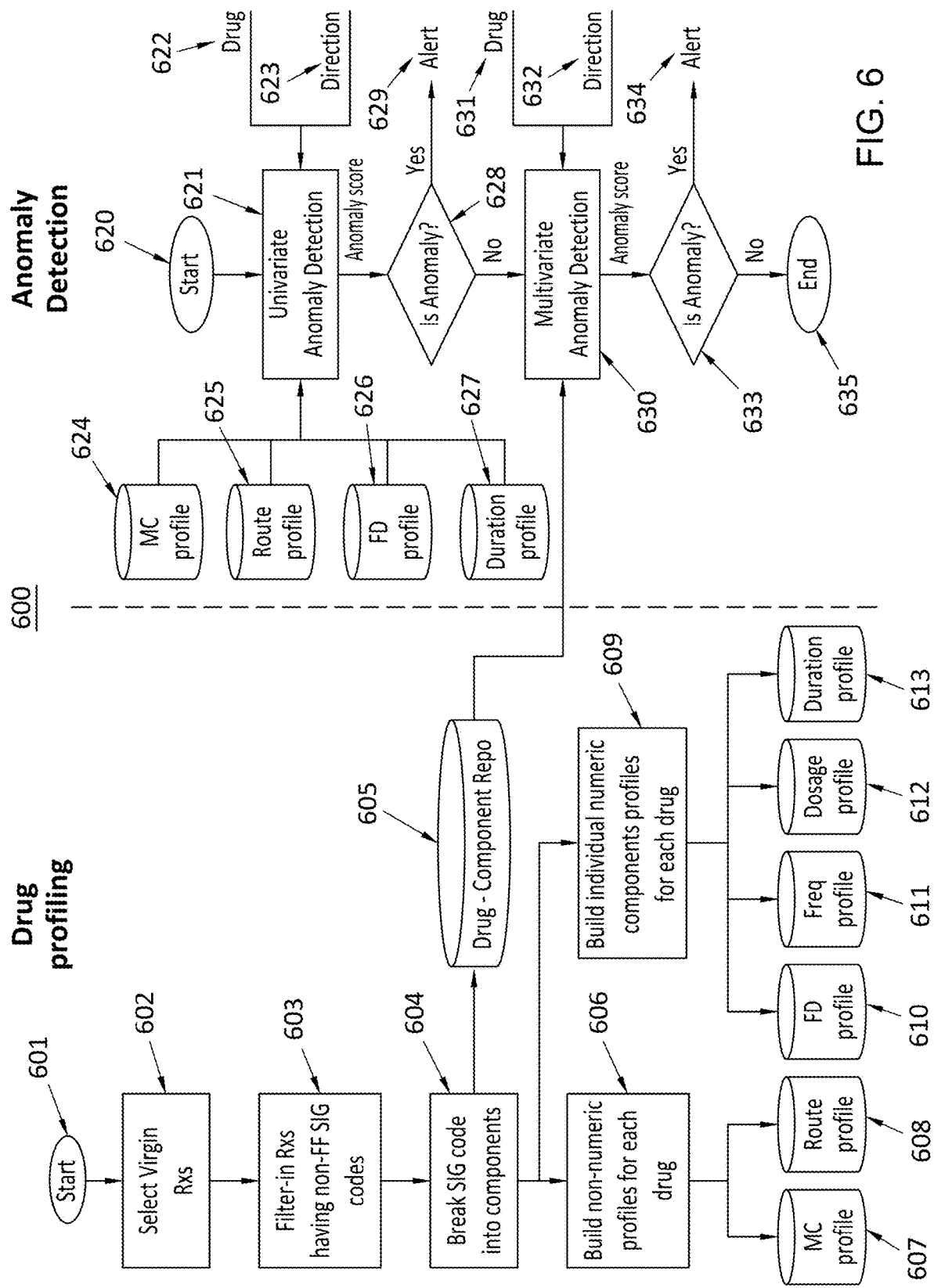
FIG. 6 illustrates a flow chart for a method of calculating an anomalous probability for drug-direction components, according to an embodiment.

Turning ahead in the drawings, FIG. 6 illustrates a flow chart for a method 600 of calculating an anomalous probability for drug-direction components, according to an embodiment. Method 600 also can include creating a drug profile for the drug prescribed and/or each drug in a LASA drug pair. Method 600 can be utilized in many different embodiments and/or examples not specifically depicted or described herein. In some embodiments, the procedures, the processes, and/or the activities of method 600 can be performed in the order presented or in parallel. In other embodiments, the procedures, the processes, and/or the activities of method 600 can be performed in any suitable order. In still other embodiments, one or more of the procedures, the processes, and/or the activities of method 600 can be combined or skipped. In several embodiments, system 300 (FIG. 3) can be suitable to perform method 600 and/or one or more of the activities of method 600.

In these or other embodiments, one or more of the activities of method 600 can be implemented as one or more computing instructions configured to run at one or more processors and configured to be stored at one or more non-transitory computer-readable media. Such non-transitory computer-readable media can be part of a computer system such as anomaly detection system 310 and/or web server 320. The processor(s) can be similar or identical to the processor(s) described above with respect to computer system 100 (FIG. 1).

In several embodiments, method 600 can include a block 601 of starting a process of creating a drug profile for multiple drugs. In many embodiment, each drug profile can be stored in a database and periodically updated based on a predetermined time period. Such a database can be similar or identical to database 408 (FIG. 4).

In many embodiments, the drug profile can be used as input data to calculating an anomalous probability for drug-direction components. In some embodiments, for selected LASA drug pairs, creating a profile of each drug in the pairs can be based on direction components, where direction components can include a respective set of instructions from a medical provider to each patient instructing the patient how to administer each drug as prescribed. Direction components can include various levels of instruction, such as: (i) frequency (once a day, two times a day etc.), (ii) dosage range (1 tab, 2 tab), and/or (iii) indications or medical conditions (blood pressure, etc.). In many embodiments, a 1-year Rx data validated by pharmacists can be used to build each drug profile. In a number of embodiments, direction components of input direction can be compared to an acceptable drug profile for that drug individually (univariate) as well as in combination with other components (multivariate) to get an anomalous probability score for deciding correctness of drug. In some embodiments, the anomalous probability score can include (i) a univariate anomaly score and/or (ii) a multivariate anomaly score. In many embodiments, method 600 can proceed after block 601 to a block 602.

In various embodiments, method 600 can include block 602 of selecting prescriptions (e.g., Rx) for each drug prescribed to create new drug profile and/or update an existing drug profile. In many embodiments, method 600 can proceed after block 602 to a block 603.

In some embodiments, method 600 can include block 603 of filtering each drug prescribed in the prescription with non-FF signetur (SIG) codes. In various embodiments, the SIG codes can include direction components (e.g., a respective set of directions) prescribed by a medical provider for a drug, as prescribed, such as qh (administer every hour), qid (administer four times a day), and other such SIG codes. For example, in SIG Code, "Sig" is short for the Latin "signetur." This means "let it be labeled." "Sig" tells the pharmacy what to include on the drug's label instructing how and when to take the medication. Pharmacies can use Sig code as a semi-structured text to transform prescribed direction to an unambiguous direction and then, dispense to patient. As another example, 1QD30D translates to 'take 1 daily for 30 days'). Whenever, Sig code cannot be determined, then the code used can include FF (Free Form) and the directions can be written as natural text (e.g., 'TAKE 1 TABLET EARLY IN THE MORNING'). In many embodiments, method 600 can proceed after block 603 to a block 604.

In several embodiments, method 600 can include block 604 of breaking the SIG codes into direction components prescribed for use by the patient. The drug components can be stored in a database 605. In many embodiments, method 600 can proceed after block 604 to a block 606 and/or a block 609.

In a number of embodiments, method 600 can include block 606 of creating non-numeric direction component profiles for each drug in a respective drug profile. In a number of embodiments, creating non-numeric profiles for direction components can trigger an alert when a direction component for a prescribed drug is not part or with an acceptable range of the acceptable drug profile. In various embodiments, when a non-numeric direction component for each drug is outside of the acceptable range of the profile but within the prescription history of the patient, an override for the alert can be implemented allowing the prescription and direction components to be dispensed to the patient. In some embodiments, block 606 can store the non-numeric profiles for each drug in database 607 and/or database 608. As an example, a non-numeric profile can include a profile of medical conditions previously prescribed for a drug. In several embodiments, database 607 can store direction components for an MC profile. For example, MC can refer to a medical condition, such as a stomach ache, a cold, a cough etc. In some embodiments, database 608 can store direction components for a route profile of the drug. For example a route profile can refer to the route of a drug intake such as 'by mouth' for tablet, 'in left ear' for drops etc. In various embodiments, method 600 can include block 609 of creating individual numeric direction component profiles for each drug in a respective drug profile. In a number of embodiments, creating individual numeric direction components can trigger an alert when a direction component for a prescribed drug is not part or with an acceptable range of the acceptable drug profile. In various embodiments, when a numeric direction component for each drug is outside of the acceptable range of the profile but within the prescription history of the patient, an override for the alert can be implemented allowing the prescription and direction components to be dispensed to the patient. In some embodiments, block 609 can store the individual numeric components. For example, individual numeric profiles can be univariate profiles of the various components of direction (direction components), such as a dosage, a frequency etc., which aids in primary checking of values of interest. In several embodiments, database 610 can store each FD profile. For example, the term FD can refer to the combined value of frequency and dosage. In many embodiments, database 611 can store direction components for frequency profiles for each drug. As an example, frequency profiles for a drug 'A' can include the probability distribution of the various frequencies prescribed for it across patient, stores, etc. In some embodiments, database 612 can store dosage profiles for storing direction components for dosage profiles. In several embodiments, database 613 can store duration profiles for each drug. For example, duration profiles for a drug 'A' can include the probability distribution of the various durations prescribed for it across patient, stores, etc. In several embodiments, method 600 can include a block 620 of starting an anomaly detection process to detect whether or not there is an anomaly for the drug being prescribed. In some embodiments, the anomaly detection process can include two levels of anomaly scores that can trigger an alert when an anomaly is detected for the drug being prescribed: (i) univariate anomaly detection and (ii) multivariate anomaly detection. In many embodiments, method 600 can proceed after block 620 to a block 621.

In various embodiments, a type of anomaly rule can be based on combining specific keywords, such as indications, a duration or a route which are provided in the directions, and patient attributes, such as age and gender available through patient details. In several embodiments, many LASA pairs can differ in the route (e.g., eyes and/or ears for drops), indications (e.g., hydroxyzine prescribed for blood pressure and hydroxyzine prescribed for diabetes), age and keywords related to "days of the month/days of a time period" for drugs (e.g., clomiphene, clomipramine). In several embodiments, by extracting relevant components from the prescribed direction, rules can be built on a case by case basis even where limited patient purchase history is available.

In various embodiments, method 600 can include block 621 of calculating an anomalous probability score for an individual drug using a univariate anomaly detection process for the drug being prescribed. In some embodiments, calculating the anomalous probability score for univariate anomaly detection for continuous components can be based on the modified z-score, as shown below in equation (3), as follows:

$$\text{UnivariateAnomaly}(x_i|\text{drug}_j) = f(0.6745*(x_i-\text{median}_{ij})*MAD_{ij}, \text{configured}_i) \text{ where } x_i = \text{value of component}_i, \text{configured}_i = \text{preconfigured limit for component}, f = \text{function to calculalte anomaly given mod } z \text{ -score and configured\_i} \quad (3)$$

where i refers to $i^{th}$ component, j refers to j'h drug, and MAD refers to Mean Absolute Deviation, x is the value (eg: if dosage is the first component, then i=1 and $x_1$=2 for 'two tablets', if frequency is the second component, then i=2 and $x_2$=1 for 'once daily'. Median$_{ij}$ is the median value of the $i^{th}$ component for the $j^{th}$ drug. MAD$_{ij}$ refers to median absolute deviation for $i^{th}$ component for the $j^{th}$ drug. Configured$_i$ refers to upper and lower bounds for the for $i^{th}$ component. 'f' is the function to calculate anomaly score for a given modified z-score and configured value. In some embodiments, block 621 can retrieve drug 622 that is being prescribed, directions components 623 for drug 622, and data from various databases as part of detecting the univariate anomaly, such as database 624 (which can be similar or identical to database 607), database 625 (which can be similar or identical to database 608), database 626 (which can be similar or identical to database 610), and/or database 627 (which can be similar or identical to database 613).

In many embodiments, method 600 can proceed after block 621 to a block 628. In a number of embodiments, method 600 can include a block 628 of determining whether or not an anomaly for the drug being prescribed has been determined based on an anomaly score from the univariate anomaly detection. If block 628 is yes, method 600 can proceed to block 629. Otherwise, block 628 is no, and method 600 can proceed to block 630.

In various embodiments, method 600 can include block 629 of triggering an alert for the drug being prescribed as containing a univariate anomaly involving further scrutiny. In some embodiments, if block 629 is triggered, the anomaly detection process terminates without proceeding to a block 630.

In various embodiments, a final score can be determined using a combination of a similarity score, an associated risk and an event rate, referred to as a combined score. In some embodiments, the pairs can be ranked according to a cumulative frequency, where a top-k pairs can be selected which can cover more than x % of the events. In several embodiments, alerting can be done for the top-k LASA pairs identified through this process. In various embodiments, in this case, x refers to a tunable parameter juxtaposed to a number of alerts generated. In some embodiments, a higher event coverage can include in a higher alert generation for the pairs. In many embodiments, the system can be flexible but also give importance to pairs which can cause more errors.

In a number of embodiments, anomaly rule identification can include two types of anomaly rules, upon establishing a final list of LASA drug pairs. In various embodiments, the two types of anomaly rules can be applied when a prescription with a LASA drug comes to the pharmacy.

In several embodiments, method 600 can include block 630 of calculating an anomalous probability score for an individual drug and direction components using a multivariate anomaly detection process for the drug being prescribed. In some embodiments, calculating the anomalous probability score for multivariate anomaly detection can include using conditional probability as shown in equation (4).

$$MultivariateAnomaly\ (d_1, d_2, \ldots, d_m \mid drug_j) = \prod_{i=1}^{m} p(d_i \mid pa_i, drug_j) \quad (4)$$

where, $d_1, d_2, \ldots, d_m$ are components of direction d, and $pa_i$ are parents of $d_i$ For example, in a direction for a $drug_i$ such as 'take 1 twice daily for 10 days', $d_i$, $d_2$, $d_3$ can be components of direction representing dosage ($d_1$=1), frequency ($d_2$=2) and duration ($d_3$=10). The multivariate anomaly score can be used as a multiplication of the probabilities (p) of each components ($d_1$, $d_2$, ...), and the graph model can be represented by parents (pa) for $drug_i$ and $component_i$. In some embodiments, block 630 can retrieve data from each drug profile (from database 605) and can retrieve drug 631 (which can be identical to drug 622) that is being prescribed, directions components 631 (which can be identical to direction components 623) for drug 632.

In many embodiments, method 600 can proceed after block 630 to a block 633. In various embodiments, method 600 can include a block 633 of determining whether or not an anomaly for the drug being prescribed has been determined based on an anomaly score for the multivariate anomaly detection. If block 633 is yes, method 600 can proceed to block 634. Otherwise, block 633 is no, and method 600 can proceed to block 635.

In various embodiments, method 600 can include block 634 of triggering an alert for the drug being prescribed as containing a multivariate anomaly involving further scrutiny. In some embodiments, if block 634 is triggered, the anomaly detection process terminates. In some embodiments, method 600 can include block 635 of terminating the anomaly detection process.

Figure 7:
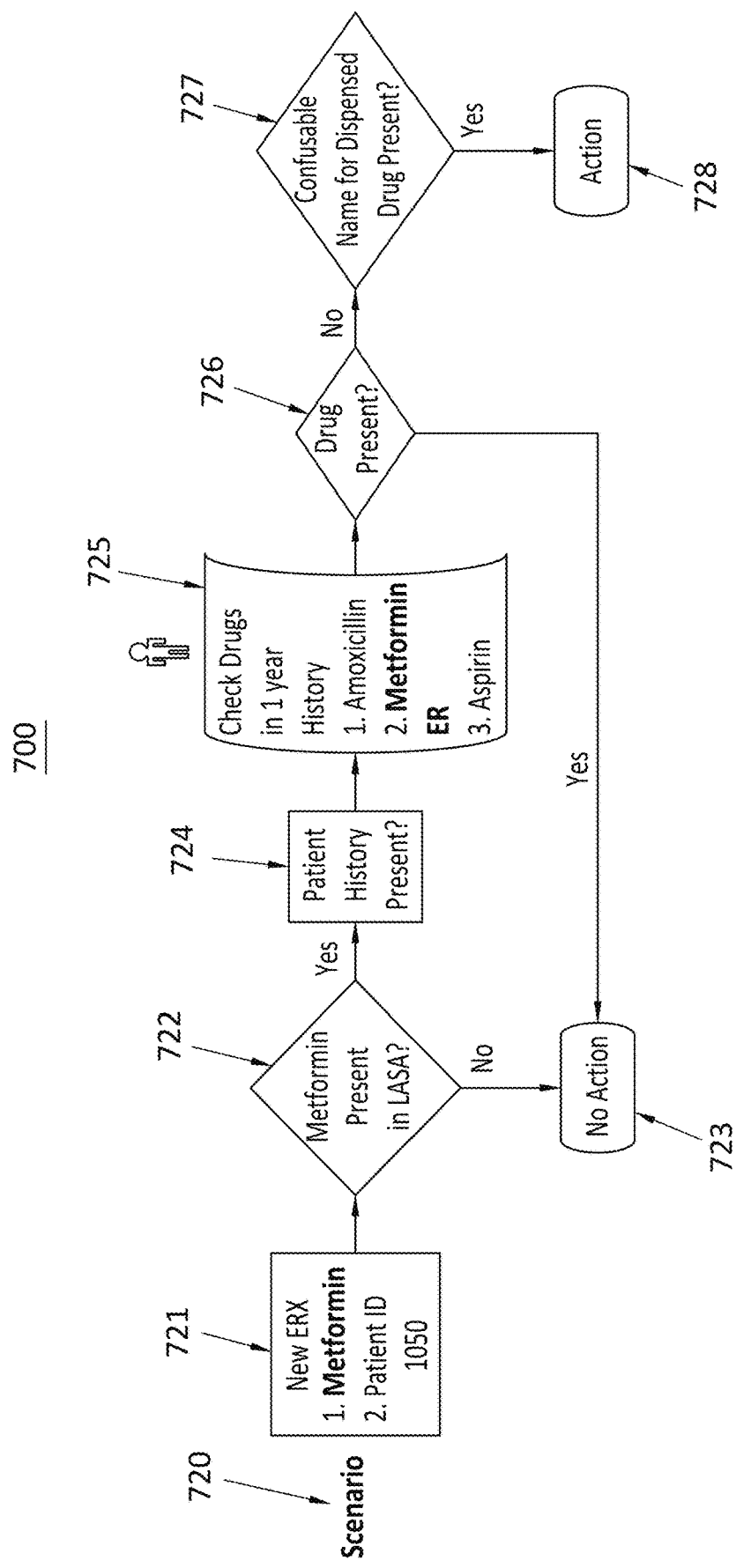
FIG. 7 illustrates an exemplary flow chart showing how a drug prescribed by a medical provider can be screened for anomalies and/or prescription errors prior to dispensing the drug as prescribed.

Turning to the drawing, FIG. 7, illustrates an exemplary flow chart of a method 700 showing how a drug prescribed by a medical provider can be screened for anomalies and/or prescription errors prior to dispensing the drug as prescribed. In some embodiments, method 700 can begin with a scenario 720 of receiving an electronic prescription (eRx) to be fulfilled by a patient. In several embodiments, method 700 also can be implemented in other scenarios for receiving a physical prescription and/or a mail order communication. In many embodiments, method 700 can proceed after scenario 720 to eRx 721.

In several embodiments, method 700 can include eRx 721 of extracting the drug information (e.g., Metformin) and patient information (e.g., a patient ID 1050) from the eRx. In many embodiments, method 700 can proceed after eRx 721 to a check point 722.

In various embodiments, method 700 can include check point 722 of identifying whether or not the drug Metformin is part of a LASA drug pair. If check point 722 is yes, method 700 can proceed to patient history 724. Otherwise check point 722 is no, method 700 can proceed to termination 723.

In some embodiments, method 700 can include patient history 724 of determining whether the drug prescribed, Metformin, is present in a drug purchase history of the patient. In several embodiments, determining whether Metformin is present in the drug purchase history can be implemented by patient profile 725 of analyzing the patient history checking for the drug previously purchased by the patient, where the analysis spans a predetermined time period of the patient prescription history, such as 1 year. In many embodiments, method 700 can proceed after patient profile 725 to a checkpoint 726.

In various embodiments, method 700 can include checkpoint 726 of determining whether or not Metformin is listed in the drug purchase history within the last year by the patient. If checkpoint 726 is yes, method 700 can proceed to termination 723. Otherwise, checkpoint 726 is no, method 700 can proceed to checkpoint 727. In some embodiments, method 700 can include termination 723 of terminating the drug anomaly detection process for the drug being prescribed prior to dispensing the drug to the patient.

In several embodiments, method 700 can include checkpoint 727 of determining whether or not a confusable name for Metformin with another drug is presents, such as a LASA drug pair. If checkpoint 727 is yes, method 700 can proceed to alert 728. Otherwise, checkpoint 727 is no, method 700 can terminate the drug anomaly detection process for the drug being prescribed prior to dispensing the drug to the patient. In some embodiments, the counterpart Metformin ER was dispensed in the past but not Metformin, thus a preventive alert is generated.

In various embodiments, method 700 can include alert 728 of displaying an alert on a user interface of a computing device that the drug being prescribed contains an anomaly to be addressed prior to dispensing the drug.

In some embodiments, a first distinction can be made by comparing the distribution of frequency components in directions of the corresponding LASA drug pair. In several embodiments, to measure the similarity of distribution, Jenson-Shannon (JS) divergence metric can be utilized to check for differences (e.g., once a day, twice a day, or another suitable period) in the distributions of frequency components of direction dispensed over previous time period, such as one year between the selected LASA pairs. In some embodiments, for pairs with a JS Divergence score greater than a specified threshold, the frequency component in the direction can be used as an alert for a deviation. For example, in Metopro-lol ER (extended-release) and Metoprolol, Metoprolol with extended-release form typically has a higher frequency than Metoprolol without ER and this distinction can be helpful to correct a wrong drug entry by comparing frequencies in the direction.

Figure 8:
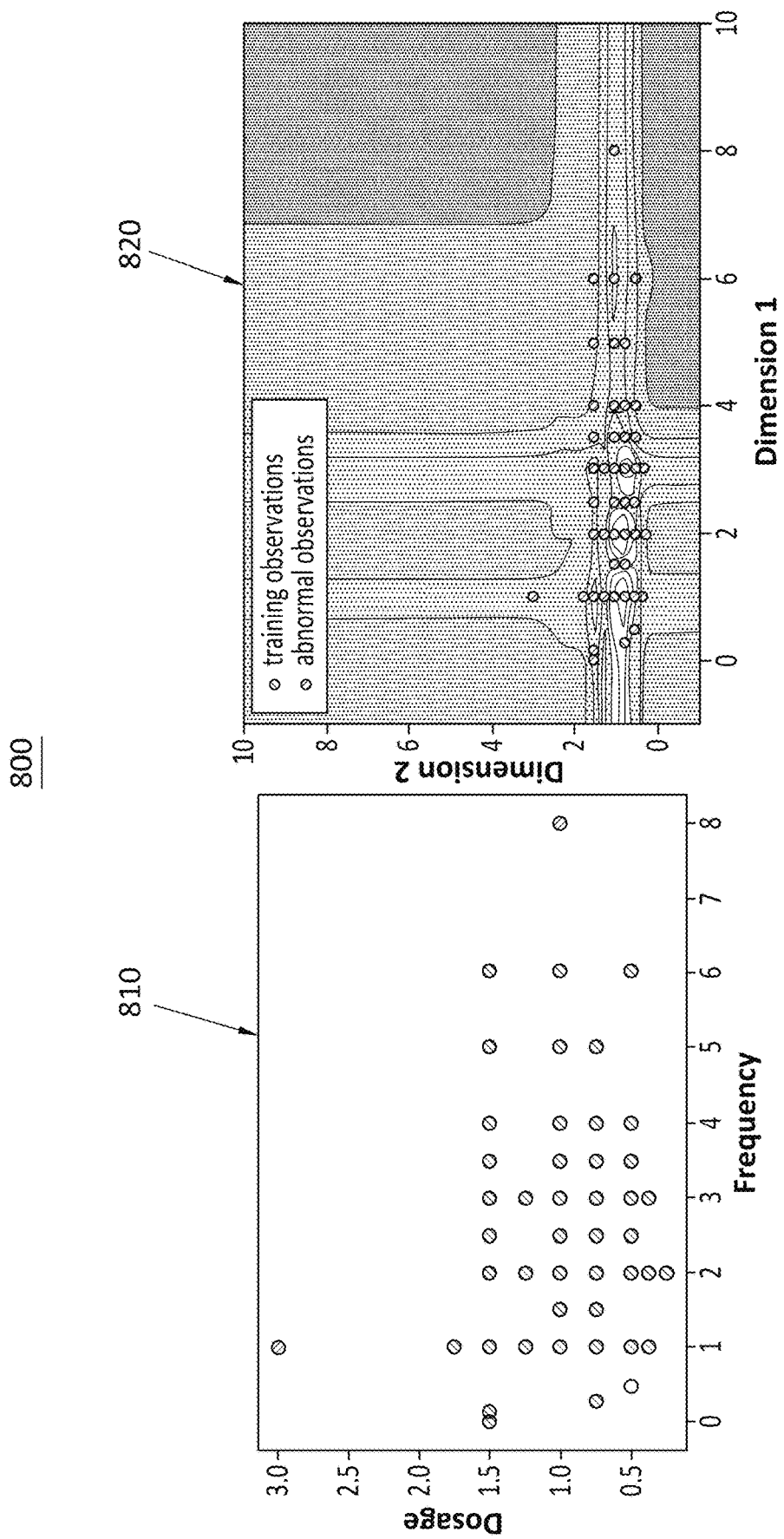
FIG. 8 illustrates two exemplary graphs showing how to observe trends in detecting drug errors for LASA drug names.

Moving forward in the drawings, FIG. 8 illustrates two exemplary graphs showing how to observe trends in detecting drug errors for LASA drug names. Graph 810 illustrates observations of the frequency and dosage within an expected range as an outcome of a model for drug over a time period of tracking data for 1 year. Graph 810 also shows two areas of outlier data representing the outlier observations of frequency and dosage for the same drug within the same 1 year data.

Graph 820 illustrates a graph where the X and Y axis are the components of a dimensionality a reduced isolation forest model used for visualization in 2 dimension: X-axis (Dimension 1) and Y axis (Dimension 2). The points represent a high dimensional data which are reduced to two-dimensions for visualization. There are multiple manifolds of the normal observations and anything outside the manifold is treated as an outlier. The background the graph represents the measure of normality of an observation.

Turning ahead in the drawings, FIG. 9 illustrates a flow chart for a method 900 of determining whether or not a drug prescribed in a prescription is an incorrect drug identified as part of a LASA pair, according to another embodiment. Method 900 also can include determining an anomaly score for the drug prescribed triggering an alert to the dispensing entity, including calculating performance metrics of the project initiative. Method 900 can be used in many different embodiments and/or examples not specifically depicted or described herein. In some embodiments, the procedures, the processes, and/or the activities of method 900 can be performed in the order presented or in parallel. In other embodiments, the procedures, the processes, and/or the activities of method 900 can be performed in any suitable order. In still other embodiments, one or more of the procedures, the processes, and/or the activities of method 900 can be combined or skipped. In several embodiments, system 300 (FIG. 3) can be suitable to perform method 900 and/or one or more of the activities of method 900.

In these or other embodiments, one or more of the activities of method 900 can be implemented as one or more computing instructions configured to run at one or more processors and configured to be stored at one or more non-transitory computer-readable media. Such non-transitory computer-readable media can be part of a computer system such as anomaly detection system 310 and/or web server 320. The processor(s) can be similar or identical to the processor(s) described above with respect to computer system 100 (FIG. 1).

In several embodiments, method 900 can include a block 910 of receiving a drug profile for a drug identified as part of a high-risk look-alike-sound-alike (LASA) drug pair prior to filling a prescription for the drug. In some embodiments, block 910 can be similar or identical to activities described above in connection with block 407 (FIG. 4) and/or block 630 (FIG. 6)

In various embodiments, block 910 also can include identifying the high-risk LASA drug pair based on at least one of (i) an orthographic similarity, (ii) a phonetic similarity, and/or (iii) a frequency of occurrence of incorrect dispensing in historical events data.

In some embodiments, to identify if a drug pair is look-alike, utilize Bi-Sim or soft-Bisim with pre-trained weights can be utilized to calculate the average look-alike similarity. In several embodiments, to identify if a drug pair is sound-alike, Editex similarity can be utilized. In various embodiments, the algorithm of bigram, soft bigram, and Editex, can be chosen after evaluating the algorithm on a set of ISMP's 956 confusion sets (both look-alike and sound-alike), which can include 724 unique drug names. In some embodiments, for each of the unique drug names, different LASA algorithm can be used to rank a top-k similar names for each drug. In many embodiments, the recall for a combination of Bigram, soft-bigram and Editex can be similar to trigram and Editex, and at k=1, the former illustrated a higher recall and thus chosen. For example, 82% LASA pairs from 956 ISMP pairs are identified with the selected threshold on the similarity score.

In many embodiments, LASA pairs with events that can be ranked according to its cumulative frequency, and top-k pairs can be selected which can cover more than x % of all events. In some embodiments, alerting can be done for the top-k LASA pairs identified through this process. In several embodiments, here, x refers to a tunable parameter juxtaposed to number of alerts generated. In various embodiments, higher event coverage can include higher alert generation for the pairs. In some embodiments, this can help the system to be flexible but also give importance to pairs which cause more errors.

In some embodiments, automatically detecting LASA events can include using a name similarity, a frequency of medication taken by a patient and a justification by a diagnostic claim. In several embodiments, the results can be based on an evaluation in a clinic setting for a single LASA pair, without analysis of the effects of a large scale, real-time implementation. In various embodiments, the problem of identifying drug prescription errors by identifying statistical outliers based on a patient's profile, can be applied for an in-patient setting. In some embodiments, the identification of wrong drug errors can include (i) utilizing data from reported errors and (ii) purchase patterns of patient available to the pharmacy. In various embodiments, the system can use multiple attributes associated with the prescription direction, such as when to take the drug, a medical condition, specific keywords, wherever available. In several embodiments, this can be a novel first work which can retrospectively evaluate the effects from a large-scale implementation of the proposed architecture on a large scale pharmacy over a test window of approximately 3 months and/or another suitable test window period.

In some embodiments, this similarity algorithm can be applied on events data to identify LASA pairs and each of LASA pairs can be ranked based on a respective combined score. For example, using this similarity algorithm, top-k pairs selected covered 75% of events, as this can be expected to generate around 3-4% alerts which are within accepted tolerance.

In several embodiments, block 910 can identify LASA drug pairs by implementing the orthographic bi similarity based on the following recurrences shown below in equation (1):

$$(i,j)=\max(f(i-1,j),f(i,j-1),f(i-1,j-1),s(x_i x_{i+1}, y_j y_{j+1})) \quad (1)$$

Where f(i, j) is a recurrence relation to find out the BI-SIM similarity between two words, where i and j are the indices of character in the word, and $x_i$ and $y_j$ represent the $i^{th}$ and $j^{th}$ character of the two words x and y respectively, and s represents n-gram similarity. In several embodiments, computing various orthographic and phonetic similarity measures on ISMP drug pairs can identify a method to find LASA pairs from events data. In some embodiments, four orthographic measures can be used, namely (i) Bi-Sim similarity, (ii) Soft Bi-Sim Similarity, (iii) Tri-Sim, and (iv) Normalized Edit distance (NED) and two phonetic measures, (i) Editex and (ii) Soundex similarity. In some embodiments, the recall can be calculated as the total number of pairs the algorithm correctly identifies from the ISMP pairs. In various embodiments, the ensemble score of Bi-Sim and Editex can include the highest recall, where selecting the highest recall can be used to identify LASA pairs from the historical events data.

In some embodiments, block 910 also can identify LASA drug pairs by implementing phonetic similarity based on the following recurrences shown below in equation (2):

$$g(i,j)=\min[\text{edit}(i-1,j)+d(si-1,si), \text{edit}(i,j-1)+d(tj-1,tj), \\ \text{edit}(i-1,j-1)+r(si,tj)] \quad (2)$$

where r(i, j)∈(0, 1, 2) and d(a, b)∈(r(i, j), 1) where d=1 for a/h/w.

Where g(i, j) is the edit distance recurrence relation for two strings s and t at indices i and j respectively with a redefined function r(a, b) and an additional function d(a, b). For Editex, the function r(a, b) returns 0 if a and b are identical, 1 if a and b are both occur in the same group, and 2 otherwise. The groups are part of Editex algorithm. The function d(a, b) is identical to r(a, b), thus allowing pairs of the same letter to correspond to single occurrences of that letter except that if a is h or w (letters that are often silent) and a is not equal to b, then d(a, b) is 1. In some embodiments, block 910 also can identify LASA drug pairs by implementing frequency of occurrence of incorrect dispensing in historical events data based on equation (3) listed above.

In some embodiments, block 910 further can include identifying the high-risk LASA drug pair based on extracting keywords from the direction components of the drug profile of the drug. In several embodiments, identifying the high-risk LASA drug pair based on comparing the keywords to an acceptable profile for the drug. In many embodiments, method 900 can proceed after block 910 to a block 920.

In various embodiments, method 900 can include block 920 of generating an anomaly score based on direction components of the drug profile. In some embodiments, block 920 can be similar or identical to activities described above in connection with block 504 (FIG. 5), 621 (FIG. 6), and/or 628 (FIG. 6).

In several embodiments, block 920 further can include generating, using an isolation forest machine-learning model, the anomaly score based on the direction components of the drug profile.

In various embodiments, the anomaly score can be based on (i) a univariate score and (ii) a multivariate score.

In some embodiments, calculating the univariate score can include comparing a component of the direction components of the drug profile to a preconfigured limit for the component.

In several embodiments, calculating the multivariate score can include using a conditional probability. In many embodiments, method 900 can proceed after block 920 to a block 930.

In a number of embodiments, method 900 additionally can include block 930 of creating a top-k LASA list of high-risk LASA pairs based on weighted LASA scores for drug pairs. In some embodiments, updating a top-k LASA List at periodic intervals can include updating the top-k list at a pre-determined 'n' month. In several embodiments, updating the top-k list can include implementing deletion parameters for each LASA drug pair to be calculated using a deletion criteria: % of Overridden Alerts for a pair >Y %. In some embodiments, a LASA drug pair can be deleted from the top-k LASA List when a predetermined percentage of overridden alerts for a LASA drug pair is greater than another predetermined percentage of an alert threshold specified as a system configuration. For example, an alert threshold can be specified as a system configuration.

In various embodiments, new LASA drug pairs can be added by using identifying LASA drug pairs at every n interval.

In some embodiments, block 930 can be similar or identical to activities described above in connection with block 408 (FIG. 4) and 413 (FIG. 4).

In many embodiments, method 900 can proceed after block 930 to a block 940, a block 950 and/or a block 960.

In some embodiments, method 900 can include block 940 of updating the top-k LASA list at periodic intervals using a feedback loop. In some embodiments, block 940 can be similar or identical to activities described above in connection with block 413 (FIG. 4).

In many embodiments, method 900 can proceed after block 940 to a block 950, a block 960, and/or a block 970.

In several embodiments, method 900 can include block 950 of deleting a first drug pair of the drug pairs from the top-k LASA list based on a deletion criteria comprising a percentage of overridden alerts for the first drug pair exceeds a predetermined threshold during a time period of the periodic intervals. In some embodiments, block 950 can be similar or identical to activities described above in connection with block 413 (FIG. 4).

In many embodiments, method 900 can proceed after block 950 to block 960 and/or block 970.

In various embodiments, method 900 can include block 960 of adding a second drug pair of the drug pairs to the top-k LASA list based at least in part on a LASA score. In some embodiments, block 960 can be similar or identical to activities described above in connection with block 413 (FIG. 4). In many embodiments, method 900 can proceed after block 960 to block 970.

In some embodiments, method 900 can include block 970 of transmitting an alert to a fulfilment screen when the anomaly score exceeds a predetermined threshold. In some embodiments, block 970 can be similar or identical to activities described above in connection with block 412 (FIG. 4), block 505 (FIG. 5), block 629 (FIG. 6), and/or block 634 (FIG. 6).

In several embodiments, block 970 can include triggering the alert for a patient prescribed a first drug based on at least a drug purchase history of the patient and a patient profile for the patient. Block 970 of triggering the alert can occur when one of (i) the first drug is part of the high-risk LASA drug pair and a counterpart drug of the high-risk LASA drug pair is found in the drug purchase history of the patient, and/or (ii) a non-electronic prescription is received for the first drug with and the patient has no previous drug purchase history.

Returning to FIG. 3, in a number of embodiments, machine learning system 311 can at least partially perform block 411 (FIG. 4) of determining whether or not the drug identified matches any of the conditions for as an incorrect drug targeting an alert.

In some embodiments, profiling system 312 can at least partially perform block 507 (FIG. 5) of retrieving stored patient purchase history, patient purchase profiles, and/or patient profiles for a predetermined period of time, block 509 (FIG. 5) of determining whether or not the drug prescribed was previously dispensed in the prescription purchase history or the prescription history of the patient over a period of time, block 601 (FIG. 6) of creating a drug profile for multiple drugs, block 602 (FIG. 6) of selecting prescriptions (e.g., Rx) for each drug prescribed to create new drug profile and/or update an existing drug profile, block 603 (FIG. 6) of filtering each drug prescribed in the prescription with non-FF signetur (SIG) codes, block 604 (FIG. 6) of breaking the SIG codes into direction components prescribed for use by the patient, and/or block 609 (FIG. 6) of creating individual numeric direction component profiles for each drug in a respective drug profile.

In several embodiments, scoring system 313 can at least partially perform block 413 (FIG. 4) of determining whether or not the correct drug is being dispensed during a drug dispensing event, block 414 (FIG. 4) of validating the drug as prescribed as a correct drug based on the output of block 413, block 415 (FIG. 4) of conducting a final inspection prior to fulfilling the prescription for the patient by dispensing the drug as prescribed, block 501 (FIG. 5) of receiving a prescription for a drug prescribed by a medical provider, block 503 (FIG. 5) of determining whether the prescribed drug is part of a LASA drug pair, block 504 (FIG. 5) of determining whether a drug-direction anomaly score for the drug being prescribed exceeds a predetermined threshold, block 508 (FIG. 5) of determining whether or not a drug prescribed in the prescription is part of a LASA drug pair counterpart prescribed and/or dispensed in the prescription purchase history or prescription history of patient over a time period, block 510 (FIG. 5) of determining whether or not the prescription was an electronic or digital prescription (e.g., eRx), block 620 (FIG. 6) of implementing an anomaly detection process to detect whether or not an anomaly is identified for the drug being prescribed, block 621 (FIG. 6) of calculating an anomalous probability score for an individual drug using a univariate anomaly detection process for the drug being prescribed, block 628 (FIG. 6) of determining whether or not an anomaly for the drug being prescribed has been noted based on an anomaly score for the univariate anomaly detection, block 630 (FIG. 6) of calculating an anomalous probability score for an individual drug and direction components using a multivariate anomaly detection process for the drug being prescribed, and/or block 633 (FIG. 6) of determining whether or not an anomaly for the drug being prescribed has been noted based on an anomaly score for the multivariate anomaly detection.

In various embodiments, communication system 314 can at least partially perform block 405 (FIG. 4) of receiving a prescription at a drug dispensary (e.g., a pharmacy) from a user as input into a fulfilment system computer, block 407 (FIG. 4) of determining whether the prescribed drug and/or the associated direction components for the patient triggers an internal alert as a potential incorrect drug being dispensed, block 412 (FIG. 4) of proactively triggering an internal alert (e.g., user interface alert) for detection of potential inaccuracies observed during the drug dispensing event, block 505 (FIG. 5) of triggering an alert based on the anomaly score exceeding a predetermined threshold, block 506 (FIG. 5) of not triggering an alert based on the anomaly score not exceeding a predetermined threshold, block 629 (FIG. 6) of triggering an alert for the drug being prescribed as containing a univariate anomaly involving further scrutiny, and/or block 634 (FIG. 6) of triggering an alert for the drug being prescribed as containing a multivariate anomaly involving further scrutiny.

In many embodiments, extracting system 315 can at least partially perform block 404 (FIG. 4) of extracting and/or parsing the electronic prescription identifying, patient information, the prescribed drug, and direction components as prescribed, In various embodiments, generating system 316 can at least partially perform block 406 (FIG. 4) of utilizing a prescription drug dispensary system that fulfills prescriptions for patients by dispensing prescription drugs, and/or block 502 (FIG. 5) of inputting the data from the prescription into a fulfilment system computer (e.g., pharmacy computer).

In some embodiments, web server 320 can include a webpage system 321. Webpage system 321 can at least partially perform sending instructions to user computers (e.g., 350-351 (FIG. 3)) based on information received from communication system 314.

In several embodiments, a good proportion of work in the domain of medication error reduction can be devoted to hospital settings, where there can be difficulty procuring huge amounts of data in electronic format. In some embodiments, one of the most common dispensing errors identified by community and hospital pharmacies can include dispensing the wrong drug, where one of the major contributing factors to these errors included look-alike, sound-alike (LASA) drugs. In various embodiments, estimates of errors can suggest a prevalence of LASA induced errors in (i) 0.00003 to 0.0022% of all prescriptions, (ii) 7% of near misses, and (iii) between 6.2 and 14.7% of all medication error events.

In several embodiments, a recall and a number of alerts and the recall on LASA events using proposed architecture is 85.6% over a period of 3 months, can illustrate approximately constant levels of recall. In many embodiments, considering no other alert system is present and each alert takes 10 seconds to be examined by the pharmacist, the proposed alert system can include 1 hour of estimated additional work for a pharmacy in a month.

In a number of embodiments, identifying incorrect drug related events induced by LASA pairs can be advantageous over using real world data from a pharmacy chain. In some embodiments, combining characteristics of drug, direction and patient attributes can be used to proactively alert for drug dispensing errors in pharmacies which can be another advantage. In several embodiments, this system can (i) provide a high recall considering this being an extremely rare event phenomena and the system and (ii) reduce the number of alerts generated leading to lower alert fatigue.

In various embodiments, automating the process of identifying LASA pairs at periodic intervals can be advantageous to capture the recent trends in events including using the complete prescription history of a patient across all pharmacy retailers. In some embodiments, another advantage can be shown by (i) lowering medication errors during fulfilment stages in Pharmacies and (ii) aiding in a shift to value based healthcare by focusing on the outcome of the patient.

Various embodiments can include a system including one or more processors and one or more non-transitory computer-readable media storing computing instructions that, when executed on the one or more processors, cause the one or more processors to perform certain acts. The acts can include receiving a drug profile for a drug identified as part of a high-risk look-alike-sound-alike (LASA) drug pair prior to filling a prescription for the drug. The acts further can include generating an anomaly score based on direction components of the drug profile. The acts also can include transmitting an alert to a fulfilment screen when the anomaly score exceeds a predetermined threshold.

A number of embodiments can include a method being implemented via execution of computing instructions configured to run at one or more processors and stored at one or more non-transitory computer-readable media. The method can include receiving a drug profile for a drug identified as part of a high-risk look-alike-sound-alike (LASA) drug pair prior to filling a prescription for the drug. The method further can include generating an anomaly score based on direction components of the drug profile. The method also can include transmitting an alert to a fulfilment screen when the anomaly score exceeds a predetermined threshold.

Although a medication dispensing system and method has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to perform functions comprising:
   receiving a drug profile for a drug identified as part of a high-risk look-alike-sound-alike (LASA) drug pair prior to filling a prescription for the drug;
   generating an anomaly score based on direction components of the drug profile; and
   transmitting an alert to a fulfilment screen when the anomaly score exceeds a predetermined threshold.

2. The system of claim 1, wherein the high-risk LASA drug pair is identified based on at least one of:
   an orthographic similarity;
   a phonetic similarity; or
   a frequency of occurrence of incorrect dispensing in historical events data.

3. The system of claim 1, wherein high-risk LASA drug pair is identified based on:
   extracting keywords from the direction components of the drug profile of the drug; and
   comparing the keywords to an acceptable profile for the drug.

4. The system of claim 1, wherein the computing instructions when executed on the one or more processors, further cause the one or more processors to perform a function comprising:
   creating a top-k LASA list of high-risk LASA pairs based on weighted LASA scores for drug pairs.

5. The system of claim 4, wherein the computing instructions when executed on the one or more processors, further cause the one or more processors to perform a function comprising:
   updating the top-k LASA list at periodic intervals using a feedback loop by:
   deleting a first drug pair of the drug pairs from the top-k LASA list based on a deletion criteria comprising a percentage of overridden alerts for the first drug pair exceeds a predetermined threshold during a time period of the periodic intervals; and
   adding a second drug pair of the drug pairs to the top-k LASA list based at least in part on a LASA score.

6. The system of claim 1, wherein generating the anomaly score comprises:
   generating, using an isolation forest machine-learning model, the anomaly score based on the direction components of the drug profile.

7. The system of claim 1, wherein the anomaly score is based on (i) a univariate score and (ii) a multivariate score.

8. The system of claim 7, wherein the univariate score is calculated based on:
   comparing a component of the direction components of the drug profile to a preconfigured limit for the component.

9. The system of claim 7, wherein the multivariate score is calculated using a conditional probability.

10. The system of claim 1, wherein transmitting the alert comprises:
    triggering the alert for a patient prescribed a first drug based on at least a drug purchase history of the patient and a patient profile for the patient, wherein triggering the alert occurs when one of:
    the first drug is part of the high-risk LASA drug pair and a counterpart drug of the high-risk LASA drug pair is found in the drug purchase history of the patient; or
    a non-electronic prescription is received for the first drug with and the patient has no previous drug purchase history.

11. A method being implemented via execution of computing instructions configured to run on one or more processors and stored at one or more non-transitory computer-readable media, the method comprising:
    receiving a drug profile for a drug identified as part of a high-risk look-alike-sound-alike (LASA) drug pair prior to filling a prescription for the drug;
    generating an anomaly score based on direction components of the drug profile; and transmitting an alert to a fulfilment screen when the anomaly score exceeds a predetermined threshold.

12. The method of claim 11, wherein the high-risk LASA drug pair is identified based on at least one of:
an orthographic similarity;
a phonetic similarity; or
a frequency of occurrence of incorrect dispensing in historical events data.

13. The method of claim 11, wherein high-risk LASA drug pair is identified based on:
extracting keywords from the direction components of the drug profile of the drug; and
comparing the keywords to an acceptable profile for the drug.

14. The method of claim 11, further comprising:
creating a top-k LASA list of high-risk LASA pairs based on weighted LASA scores for drug pairs.

15. The method of claim 14, further comprising:
updating the top-k LASA list at periodic intervals using a feedback loop by:
deleting a first drug pair of the drug pairs from the top-k LASA list based on a deletion criteria comprising a percentage of overridden alerts for the first drug pair exceeds a predetermined threshold during a time period of the periodic intervals; and
adding a second drug pair of the drug pairs to the top-k LASA list based at least in part on a LASA score.

16. The method of claim 11, wherein generating the anomaly score comprises:
generating, using an isolation forest machine-learning model, the anomaly score based on the direction components of the drug profile.

17. The method of claim 11, wherein the anomaly score is based on (i) a univariate score and (ii) a multivariate score.

18. The method of claim 17, wherein the univariate score is calculated based on:
comparing a component of the direction components of the drug profile to a preconfigured limit for the component.

19. The method of claim 17, wherein the multivariate score is calculated using a conditional probability.

20. The method of claim 11, wherein transmitting the alert comprises:
triggering the alert for a patient prescribed a first drug based on at least a drug purchase history of the patient and a patient profile for the patient, wherein triggering the alert occurs when one of:
the first drug is part of the high-risk LASA drug pair and a counterpart drug of the high-risk LASA drug pair is found in the drug purchase history of the patient; or
a non-electronic prescription is received for the first drug with and the patient has no previous drug purchase history.

* * * * *